(12) United States Patent
Hart et al.

(10) Patent No.: US 8,343,005 B2
(45) Date of Patent: Jan. 1, 2013

(54) MULTI-SPEED TRANSMISSION HAVING FOUR PLANETARY GEAR SETS

(75) Inventors: James M. Hart, Belleville, MI (US); Scott H. Wittkopp, Ypsilanti, MI (US); Edward W. Mellet, Rochester Hills, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 13/049,940

(22) Filed: Mar. 17, 2011

(65) Prior Publication Data
US 2011/0256977 A1    Oct. 20, 2011

Related U.S. Application Data

(60) Provisional application No. 61/324,597, filed on Apr. 15, 2010.

(51) Int. Cl.
 *F16H 3/62* (2006.01)
(52) U.S. Cl. ............... 475/276; 475/279; 475/903
(58) Field of Classification Search ................ 475/276, 475/279, 280, 290, 903
See application file for complete search history.

(56) References Cited

U.S. PATENT DOCUMENTS

| | | | |
|---|---|---|---|
| 4,070,927 A | 1/1978 | Polak | |
| 4,683,776 A | 8/1987 | Klemen | |
| 5,919,111 A * | 7/1999 | Park | 475/269 |
| 6,558,287 B2 | 5/2003 | Hayabuchi et al. | |
| 7,101,305 B2 | 9/2006 | Tabata et al. | |
| 7,163,484 B2 | 1/2007 | Klemen | |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0113844 A1* | 5/2008 | Baldwin | 475/276 |
| 2008/0161149 A1* | 7/2008 | Diosi et al. | 475/276 |

* cited by examiner

*Primary Examiner* — Edwin A Young

(57) ABSTRACT

A transmission is provided having an input member, an output member, two planetary gear sets, another two planetary gear sets that may be stacked or nested to form a planetary gear set assembly, a plurality of coupling members and a plurality of torque transmitting devices. Each of the planetary gear sets includes first, second and third members. The stacked or nested planetary gear set assembly has a carrier member for rotatably supporting a first plurality of pinion gears and a second plurality of pinion gears, a ring gear and a common member. The torque transmitting devices include clutches and brakes.

19 Claims, 2 Drawing Sheets

| GEAR STATE | GEAR RATIO | RATIO STEP | TORQUE TRANSMITTING ELEMENTS ||||||
|---|---|---|---|---|---|---|---|---|
| | | | 32 | 34 | 30 | 28 | 36 | 26 |
| Rev | -3.371 | | | X | | | X | X |
| N | | -0.93 | | | | | | |
| 1st | 3.632 | | | X | X | | X | |
| 2nd | 2.111 | 1.72 | X | X | X | | | |
| 3rd | 1.455 | 1.45 | | X | X | | | X |
| 4th | 1.213 | 1.20 | X | | X | | | X |
| 5th | 1.000 | 1.21 | | | X | X | | X |
| 6th | 0.804 | 1.24 | X | | | X | | X |
| 7th | 0.697 | 1.15 | | X | | X | | X |
| 8th | 0.578 | 1.21 | X | X | | X | | |

X = ON - ENGAGED CARRYING TORQUE
O = ON - ENGAGED NOT CARRYING TORQUE

FIG. 3

MULTI-SPEED TRANSMISSION HAVING FOUR PLANETARY GEAR SETS

CROSS-REFERENCE TO RELATED APPLICATIONS

This application claims priority to U.S. Provisional Application No. 61/324,597, filed on Apr. 15, 2010, which is hereby incorporated in its entirety herein by reference.

FIELD

The invention relates generally to a multiple speed transmission having a plurality of planetary gear sets and a plurality of torque transmitting devices and more particularly to a transmission having eight or more speeds, two planetary gear sets, another two planetary gear sets that are stackable and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A multi-speed transmission is provided having an input member, an output member, two planetary gear sets, another two planetary gear sets that are stackable to form a stacked or nested planetary gear set assembly, a plurality of coupling members and a plurality of torque transmitting devices. Each of the two planetary gear sets includes first, second and third members. The stacked or nested planetary gear set assembly has a sun gear, a carrier member for rotatably supporting a first plurality of pinion gears and a second plurality of pinion gears, a common member and a ring gear. The common member is a ring and a sun gear integrally formed as a unitary member or a ring and a sun gear joined by a rigid fixed connection (i.e. a shaft or hub). The torque transmitting devices are for example clutches and brakes.

In another embodiment of the present invention, a transmission is provided having an input shaft, an output shaft, a first planetary gear set having a sun gear, a carrier member for rotatably supporting a plurality of pinion gears and a ring gear member, a second planetary gear set having a sun gear, a carrier member for rotatably supporting a plurality of pinion gears and a ring gear member, a planetary gear set assembly having a sun gear, a carrier member for rotatably supporting a first plurality of pinion gears and a second plurality of pinion gears, a ring gear and a common member. The first plurality of pinion gears is disposed radially inward of the common member and the second plurality of pinion gears is disposed radially outward of the common member.

In yet another embodiment of the present invention, the common member of the planetary gear set assembly is a gear having an outer surface and an inner surface. The outer surface has a plurality of gear teeth and the inner surface has a plurality of gear teeth. The plurality of gear teeth disposed on the inner surface mesh with the first plurality of pinion gears and the plurality of gear teeth disposed on the outer surface mesh with the second plurality of pinion gears.

In yet another embodiment of the present invention, a first interconnecting member continuously interconnects the sun gear of the first planetary gear set with the sun gear of the second planetary gear set.

In still another embodiment of the present invention, a second interconnecting member continuously interconnects the ring gear of the first planetary gear set with the carrier member of the second planetary gear set.

In still another embodiment of the present invention, a third interconnecting member continuously interconnects the ring gear of the second planetary gear set with the carrier member of the planetary gear set assembly.

In still another embodiment of the present invention, a first torque transmitting mechanism is selectively engageable to interconnect the common member of the planetary gear set assembly with the input member.

In still another embodiment of the present invention, a second torque transmitting mechanism is selectively engageable to interconnect the ring of the first planetary gear set and the carrier member of the second planetary gear set with the input member.

In still another embodiment of the present invention, a third torque transmitting mechanism is selectively engageable to interconnect the sun gears of the first and second planetary gear sets with the input member.

In still another embodiment of the present invention, a fourth torque transmitting mechanism is selectively engageable to interconnect the sun gear of the planetary gear set assembly with a stationary member.

In another embodiment of the present invention, a fifth torque transmitting mechanism is selectively engageable to interconnect the ring gear of the planetary gear set assembly with the stationary member.

In another embodiment of the present invention, a sixth torque transmitting mechanism is selectively engageable to interconnect the ring gear of the first planetary gear set and the carrier member of the second planetary gear set with the stationary member.

In another embodiment of the present invention, the torque transmitting mechanisms are selectively engageable in combinations of at least three to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the embodiments of the eight speed automatic transmission of the present invention have an arrangement of permanent mechanical connections between the components or elements of the four planetary gear sets. A first component or element of a first planetary gear set is permanently coupled to a first component or element of the second planetary gear set. A third component or element of the first planetary gear set is permanently coupled to second component or element of the second planetary gear set. A third component or element of a second planetary gear set is permanently coupled to second component or element of the third planetary gear and to the second component or element of the fourth planetary gear set. A third component or element of a third planetary gear set is permanently coupled to a first component or element of the fourth planetary gear set.

Figure 1:
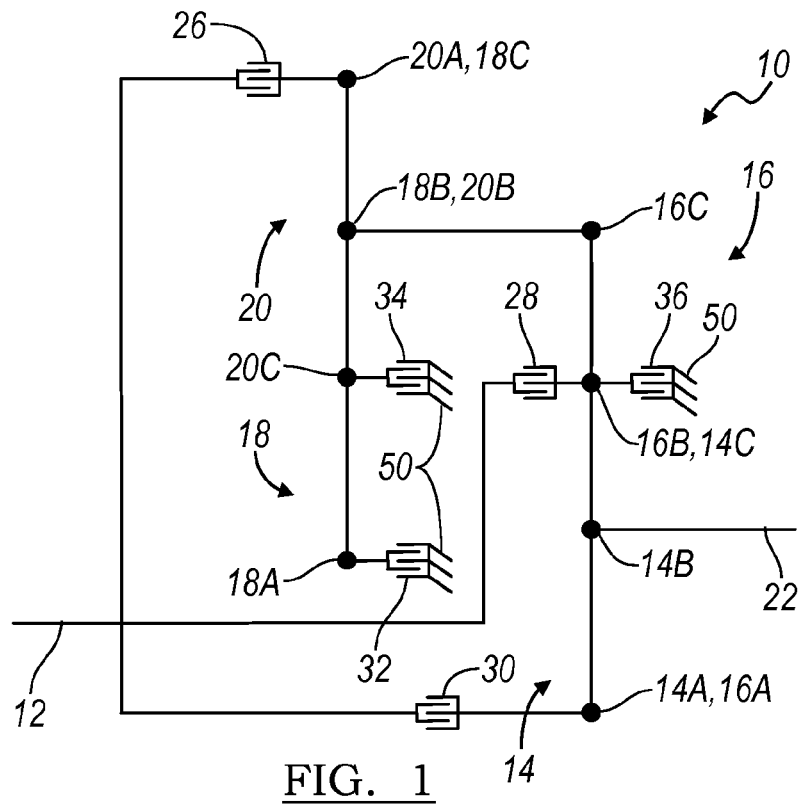
FIG. 1 is a lever diagram of an embodiment of a eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. In the lever diagram of FIG. 1, the levers for the first planetary gear set 14 and the second planetary gear set 16 have been combined into a single four node lever having: a first node 14A, 16A a second node 14B, a third node 14C, 16B and a fourth node 16C. Thus, the first member 14A of the first planetary gear set is coupled to the first member 16A of the second planetary gear set and the third member 14C of the first planetary gear set is coupled to the second member 16B of the second planetary gear set. The levers for the third planetary gear set 18 and the fourth planetary gear set 20 have been combined into a single four node lever having: a first node 18A, a second node 20C, a third node 18B, 20B and a fourth node 18C, 20A. Thus, the second member 18B of the third planetary gear set 18 is coupled to the second member 20B of the fourth planetary gear and the first member 20A of the fourth planetary gear set is coupled to the third member 18C of the third planetary gear set 18. The output member 22 is coupled to the second node 14B. The fourth node 16C is coupled to third node 18B, 20B.

A first clutch 26 selectively connects the input member or shaft 12 with the fourth node 18C, 20A of the combined levers of the third and fourth planetary gear sets 18, 20. A second clutch 28 selectively connects the input member or shaft 12 with the third node 14C, 16B of the combined levers of the first and second planetary gear sets 14, 16. A third clutch 30 selectively connects the input member or shaft 12 with the first node 14A, 16A of the combined levers of the first and second planetary gear sets 14, 16. A first brake 32 selectively connects the first node 18A of the combined levers of the third and fourth planetary gear sets 18, 20 with a stationary member or transmission housing 50. A second brake 34 selectively connects the second node 20C of the combined levers of the third and fourth planetary gear sets 18, 20 with a stationary member or transmission housing 50. A third brake 36 selectively connects the third node 14C, 16B of the combined levers of the first and second planetary gear sets 14, 16 with a stationary member or transmission housing 50.

Figure 2:
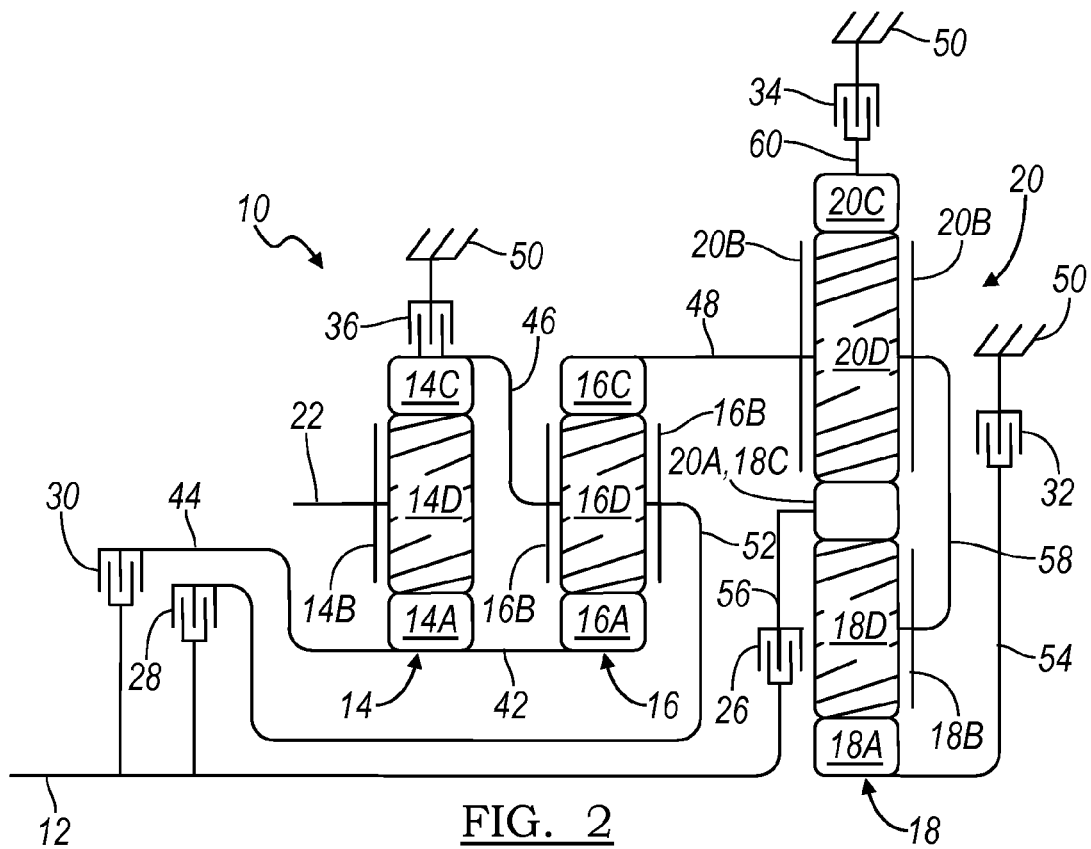
FIG. 2 is a diagrammatic illustration of an embodiment of a eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and with a second shaft or interconnecting member 44. The ring gear member 14C is connected for common rotation with a third shaft or interconnecting member 46. The planet carrier member 14B is connected for common rotation with and the output shaft or member 22. The planet gears 14D are each configured to intermesh with both the sun gear member 14A and the ring gear member 14C.

The planetary gear set 16 includes a ring gear member 16C, a sun gear member 16A and a planet gear carrier member 16B that rotatably supports a set of planet gears 16D (only one of which is shown). The sun gear member 16A is connected for common rotation with the first shaft or interconnecting member 42. The ring gear member 16C is connected for common rotation with the fourth shaft or interconnecting member 48. The planet carrier member 16B is connected for common rotation with the third shaft or interconnecting member 46 and with a fifth shaft or interconnecting member 52. The planet gears 16D are each configured to intermesh with both the sun gear member 16A and the ring gear member 16C.

The arrangement of and the mechanical connections between the first and second planetary gear sets 14, 16 forms a Simpson gear train. More specifically, the side by side arrangement where the sun gear 14A of the first planetary gear set 14 is coupled to the sun gear 16A of the second planetary gear set 16 forms the above mentioned gear train. Of course, the sun gears 14A and 16A may be formed of a unitary member or long pinion gear having the same or different number of teeth at either ends of the pinion.

In an embodiment of the present invention, the ring gear of planetary gear set 18 and the sun gear of planetary gear set 20 are formed as a single or common component or member 18C, 20A. Thus, with respect to planetary gear set 18 component 18C, 20A acts as a ring gear and with respect to planetary gear set 20 component 18C, 20A acts as a sun gear. The shared component or common member 18C, 20A enables the third and fourth planetary gear sets 18 and 20 to be stacked or arranged radially, where the fourth planetary gear set 20 is positioned radially outward of the third planetary gear set 18 (as shown in FIG. 2). Accordingly, the shared component or common member 18C, 20A is a gear having an outer surface and an inner surface. The outer surface of common member 18C, 20A has a plurality of gear teeth that enable it to function as a sun gear. The inner surface of common member 18C, 20A has a plurality of gear teeth that enable it to function as a ring gear. Moreover, planetary gear set 18 includes a sun gear member 18A and a planet gear carrier member 18B that rotatably supports a set of planet gears 18D (only one of which is shown). The sun gear member 18A is connected for common rotation with a sixth shaft or interconnecting member 54. The common member 18C, 20A is connected for common rotation with a seventh shaft or interconnecting member 56. The planet carrier member 18B is connected for common rotation with an eighth shaft or interconnecting member 58. The planet gears 18D are each configured to intermesh with both the sun gear member 18A and the common member 18C, 20A.

The planetary gear set 20 includes common member 18C, 20A, a ring gear member 20C and a planet gear carrier member 20B that rotatably supports a set of planet gears 20D (only one of which is shown). The common member 18C, 20A is connected for common rotation with the seventh shaft or interconnecting member 56. The ring gear member 20C is connected for common rotation with a ninth shaft or interconnecting member 60. The planet carrier member 20B is connected for common rotation with the fourth shaft or interconnecting member 48 and with the eighth shaft or interconnecting member 58. The planet gears 20D are each configured to intermesh with both the common member 18C, 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and first brake 32, second brake 34 and third brake 36 allow for selective interconnection of the shafts or interconnecting members, members of the planetary gear sets and the housing. For example, the first clutch 26 is selectively engageable to connect the input shaft or member 12 with the seventh shaft or interconnecting member 56. The second clutch 28 is selectively engageable to connect the input shaft or member 12 with the fifth shaft or interconnecting member 52. The third clutch 30 is selectively engageable to connect the input shaft or member 12 with the second shaft or interconnecting member 44. The first brake 32 is selectively engageable to connect the sixth shaft or interconnecting member 54 with the stationary element or the transmission housing 50 in order to restrict the member 54 from rotating relative to the transmission housing 50. The second brake 34 is selectively engageable to connect the ninth shaft or interconnecting member 60 with the stationary element or the transmission housing 50 in order to restrict the member 60 from rotating relative to the transmission housing 50. The third brake 36 is selectively engage-able to connect the third shaft or interconnecting member 46 with the stationary element or the transmission housing 50 in order to restrict the member 46 from rotating relative to the transmission housing 50.

Referring now to FIG. 2 and FIG. 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34 and third brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26, second brake 34 and third brake 36 are engaged or activated. The first clutch 26 connects the input shaft or member 12 with the seventh shaft or interconnecting member 56. The second brake 34 connects the ninth shaft or interconnecting member 60 with the stationary element or the transmission housing 50 in order to restrict the member 60 from rotating relative to the transmission housing 50. The third brake 36 connects the third shaft or interconnecting member 46 with the stationary element or the transmission housing 50 in order to restrict the member 46 from rotating relative to the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the transmission 10, the ring gear of planetary gear set 18 and the sun gear of planetary gear set 20 are separate components or gears, namely ring gear 18C and sun gear 20A, that are joined by a rigid member such as a hub or shaft or the like. Moreover, the carrier members 18B and 20B are separate carrier members that are joined by a rigid member such as a hub or shaft or the like. Accordingly, carrier members 18B and 20B each independently support a plurality of pinions 18D and 20D, respectively. In the instant embodiment, planetary gear sets 18 and 20 are not stacked or nested. Thus, four distinct planetary gear sets 14, 16, 18 and 20 provide the eight forward and one reverse gear ratios.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
   an input member;
   an output member;
   a first planetary gear set having a first, a second and a third member;
   a second planetary gear set having a first, a second and a third member;
   a third planetary gear set having a first, a second and a third member;
   a fourth planetary gear set having a first, a second and a third member;
   a first interconnecting member continuously interconnecting the first member of the first planetary gear set with the first member of the second planetary gear set;
   a second interconnecting member continuously interconnecting the third member of the first planetary gear set with the second member of the second planetary gear set;
   a third interconnecting member continuously interconnecting the third member of the second planetary gear set with the second member of the fourth planetary gear set;
   a fourth interconnecting member continuously interconnecting the second member of the third planetary gear set with second member of the fourth planetary gear set; and
   at least six torque transmitting mechanisms each selectively engageable to interconnect at least one of the first, second and third members of the first, second, third and fourth planetary gear sets with another of the first, second and third members of the first, second, third and fourth planetary gear sets and a stationary member, and
   wherein the at least six torque transmitting mechanisms are selectively engageable in combinations of at least three to establish at least eight forward speed ratios and at least one reverse speed ratio between the input member and the output member.

2. The transmission of claim 1 wherein a first of the at least six torque transmitting mechanisms is selectively engageable to interconnect the third member of the third planetary gear set and the first member of the fourth planetary gear with the input member.

3. The transmission of claim 2 wherein a second of the at least six torque transmitting mechanisms is selectively engageable to interconnect the third member of the first planetary gear set and the second member of the second planetary gear set with the input member.

4. The transmission of claim 3 wherein a third of the at least six torque transmitting mechanisms is selectively engageable to interconnect the first members of the first and second planetary gear sets with the input member.

5. The transmission of claim 4 wherein a fourth of the at least six torque transmitting mechanisms is selectively engageable to interconnect the first member of the third planetary gear set with a stationary member.

6. The transmission of claim 5 wherein a fifth of the at least six torque transmitting mechanisms is selectively engageable to interconnect the third member of the fourth planetary gear set with the stationary member.

7. The transmission of claim 6 wherein a sixth of the at least six torque transmitting mechanisms is selectively engageable to interconnect the third member of the first planetary gear set and the second member of the second planetary gear set with the stationary member.

8. The transmission of claim 1 wherein the first members of the first, second, third and fourth planetary gear sets are sun gears, the second members of the first, second, third and fourth planetary gear sets are carrier members and the third members of the first, second, third and fourth planetary gear sets are ring gears.

9. The transmission of claim 8 wherein the ring gear of the third planetary gear set and the sun gear of the fourth planetary gear set member is formed as a unitary gear member having an outer surface and an inner surface, wherein the outer surface has a plurality of gear teeth and the inner surface has a plurality of gear teeth.

10. The transmission of claim 9 wherein the unitary gear member meshes with a first plurality of pinion gears rotatably supported by the carrier member of the third planetary gear set and a second plurality of pinion gears rotatably supported by the carrier member of the fourth planetary gear set.

11. The transmission of claim 10 wherein the carrier member of the third planetary gear set and the carrier member of the fourth planetary gear set assembly are formed as a single carrier member.

12. A transmission comprising:
    an input member;
    an output member;
    a first planetary gear set having a first, a second and a third member;
    a second planetary gear set having a first, a second and a third member;
    a planetary gear set assembly having a first member, a second member, a third member, a fourth member and a fifth member;
    a first interconnecting member continuously interconnecting the first member of the first planetary gear set with the first member of the second planetary gear set;
    a second interconnecting member continuously interconnecting the third member of the first planetary gear set with the second member of the second planetary gear set;
    a third interconnecting member continuously interconnecting the third member of the second planetary gear set with the third member of the planetary gear set assembly;
    a fourth interconnecting member continuously interconnecting the second member of the planetary gear set assembly with third member of the planetary gear set assembly
    a first torque transmitting mechanism selectively engageable to interconnect the fifth member of the planetary gear set assembly with the input member;
    a second torque transmitting mechanism selectively engageable to interconnect the third member of the first planetary gear set and the second member of the second planetary gear set with the input member;
    a third torque transmitting mechanism selectively engageable to interconnect the first members of the first and second planetary gear sets with the input member;
    a fourth torque transmitting mechanism selectively engageable to interconnect the first member of the planetary gear set assembly with a stationary member;
    a fifth torque transmitting mechanism selectively engageable to interconnect the fourth member of the planetary gear set assembly with the stationary member; and
    a sixth torque transmitting mechanism selectively engageable to interconnect the third member of the first planetary gear set and the second member of the second planetary gear set with the stationary member, and wherein the torque transmitting mechanisms are selectively engageable in combinations of at least three to establish at least eight forward speed ratios and at least one reverse speed ratio between the input member and the output member.

13. The transmission of claim 12 wherein the first members of the first and second planetary gear sets and the first member of the planetary gear set assembly are sun gears, the second and third members of the planetary gear set assembly and the second members of the first and second planetary gear sets are carrier members and the third members of the first and second planetary gear sets and fourth member of the planetary gear set assembly are ring gears.

14. The transmission of claim 12 wherein the fifth member of the planetary gear set assembly is a gear having an outer surface and an inner surface, wherein the outer surface has a plurality of gear teeth and the inner surface has a plurality of gear teeth.

15. The transmission of claim 12 wherein the fifth member of the planetary gear set assembly meshes with the a first plurality of pinion gears rotatably supported by the second member of the planetary gear set assembly and with a second plurality of pinion gears rotatably supported by the third member of the planetary gear set assembly.

16. A transmission comprising:
an input shaft;
an output shaft;
a first planetary gear set having a sun gear, a carrier member for rotatably supporting a plurality of pinion gears and a ring gear member;
a second planetary gear set having a sun gear, a carrier member for rotatably supporting a plurality of pinion gears and a ring gear member;
a planetary gear set assembly having a sun gear, a first carrier member for rotatably supporting a first plurality of pinion gears and a second carrier member for rotatably supporting a second plurality of pinion gears, a ring gear and a common member, wherein the first plurality of pinion gears is disposed radially inward of the common member and the second plurality of pinion gears is disposed radially outward of the common member;
a first interconnecting member continuously interconnecting the sun gear of the first planetary gear set with the sun gear of the second planetary gear set;
a second interconnecting member continuously interconnecting the ring gear of the first planetary gear set with the carrier member of the second planetary gear set;
a third interconnecting member continuously interconnecting the ring gear of the second planetary gear set with the second carrier member of the planetary gear set assembly;
a fourth interconnecting member continuously interconnecting the first carrier member of the planetary gear set assembly with second carrier member of the planetary gear set assembly;
a first torque transmitting mechanism selectively engageable to interconnect the common member of the planetary gear set assembly with the input member;
a second torque transmitting mechanism selectively engageable to interconnect the ring of the first planetary gear set and the carrier member of the second planetary gear set with the input member;
a third torque transmitting mechanism selectively engageable to interconnect the sun gears of the first and second planetary gear sets with the input member;

a fourth torque transmitting mechanism selectively engageable to interconnect the sun gear of the planetary gear set assembly with a stationary member;
a fifth torque transmitting mechanism selectively engageable to interconnect the ring gear of the planetary gear set assembly with the stationary member; and
a sixth torque transmitting mechanism selectively engageable to interconnect the ring gear of the first planetary gear set and the carrier member of the second planetary gear set with the stationary member, and
wherein the torque transmitting mechanisms are selectively engageable in combinations of at least three to establish at least eight forward speed ratios and at least one reverse speed ratio between the input member and the output member.

17. The transmission of claim 16 wherein common member of the planetary gear set assembly is a gear having an outer surface and an inner surface, wherein the outer surface has a plurality of gear teeth and the inner surface has a plurality of gear teeth, and wherein the plurality of gear teeth disposed on the inner surface mesh with the first plurality of pinion gears and the plurality of gear teeth disposed on the outer surface mesh with the second plurality of pinion gears.

18. A transmission comprising:
an input shaft;
an output shaft;
a first planetary gear set having a sun gear, a carrier member for rotatably supporting a plurality of pinion gears and a ring gear member;
a second planetary gear set having a sun gear, a carrier member for rotatably supporting a plurality of pinion gears and a ring gear member;
a planetary gear set assembly having a sun gear, a carrier member for rotatably supporting a first plurality of pinion gears and a second plurality of pinion gears, a ring gear and a common member, wherein the first plurality of pinion gears is disposed radially inward of the common member and the second plurality of pinion gears is disposed radially outward of the common member;
a first interconnecting member continuously interconnecting the sun gear of the first planetary gear set with the sun gear of the second planetary gear set;
a second interconnecting member continuously interconnecting the ring gear of the first planetary gear set with the carrier member of the second planetary gear set;
a third interconnecting member continuously interconnecting the ring gear of the second planetary gear set with the carrier member of the planetary gear set assembly;
a first torque transmitting mechanism selectively engageable to interconnect the common member of the planetary gear set assembly with the input member;
a second torque transmitting mechanism selectively engageable to interconnect the ring of the first planetary gear set and the carrier member of the second planetary gear set with the input member;
a third torque transmitting mechanism selectively engageable to interconnect the sun gears of the first and second planetary gear sets with the input member;
a fourth torque transmitting mechanism selectively engageable to interconnect the sun gear of the planetary gear set assembly with a stationary member;
a fifth torque transmitting mechanism selectively engageable to interconnect the ring gear of the planetary gear set assembly with the stationary member; and
a sixth torque transmitting mechanism selectively engageable to interconnect the ring gear of the first planetary gear set and the carrier member of the second planetary gear set with the stationary member, and wherein the torque transmitting mechanisms are selectively engageable in combinations of at least three to establish at least eight forward speed ratios and at least one reverse speed ratio between the input member and the output member.

19. The transmission of claim 18 wherein common member of the planetary gear set assembly is a gear having an outer surface and an inner surface, wherein the outer surface has a plurality of gear teeth and the inner surface has a plurality of gear teeth, and wherein the plurality of gear teeth disposed on the inner surface mesh with the first plurality of pinion gears and the plurality of gear teeth disposed on the outer surface mesh with the second plurality of pinion gears.

\* \* \* \* \*